UNITED STATES PATENT OFFICE.

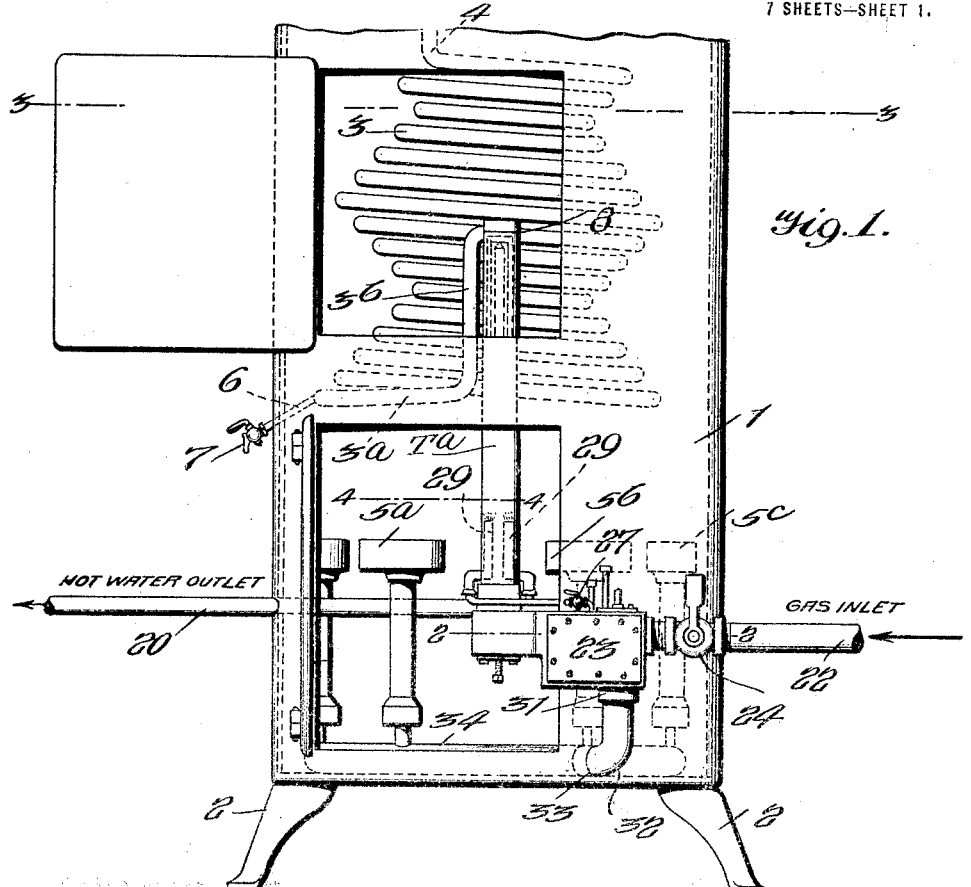

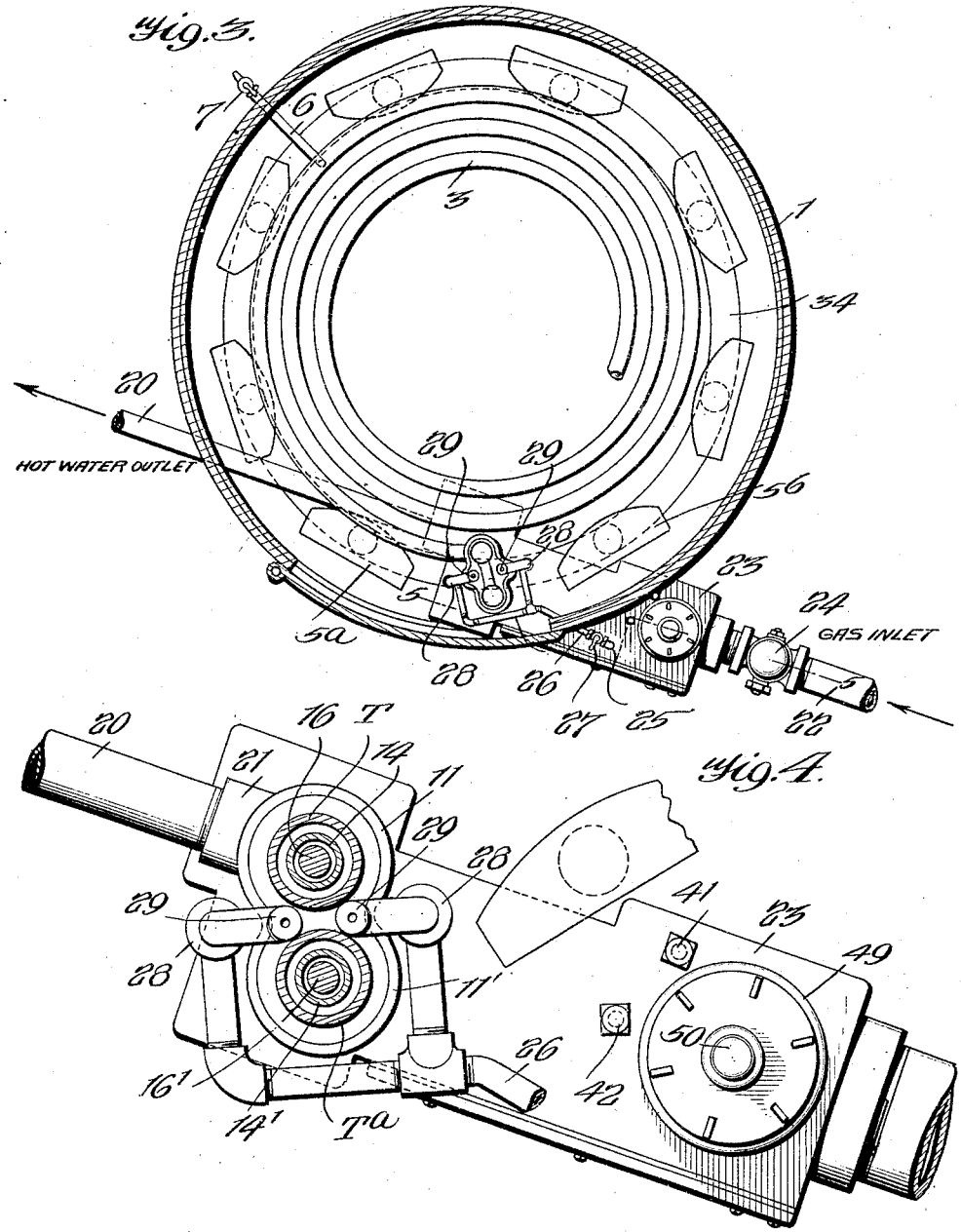

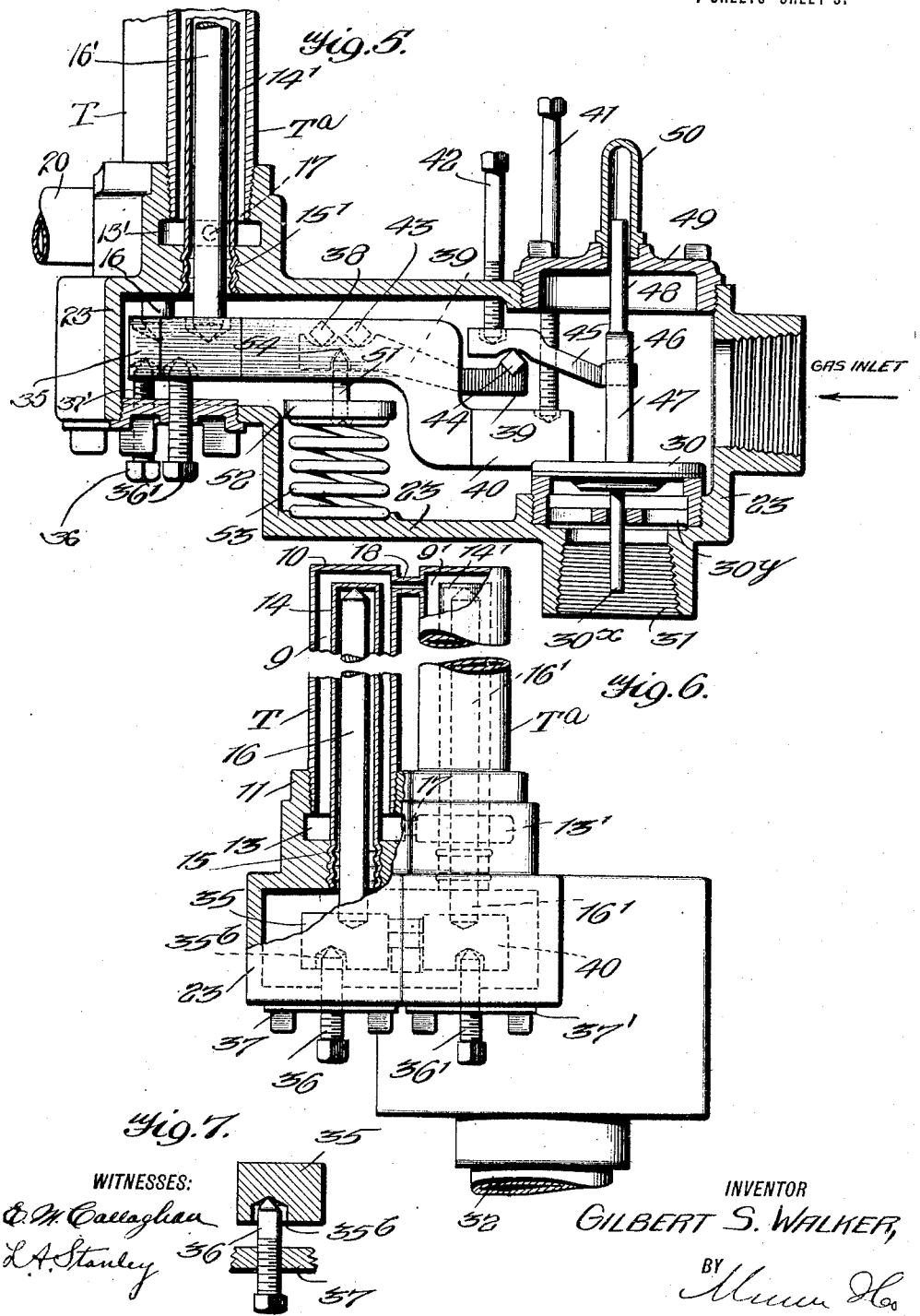

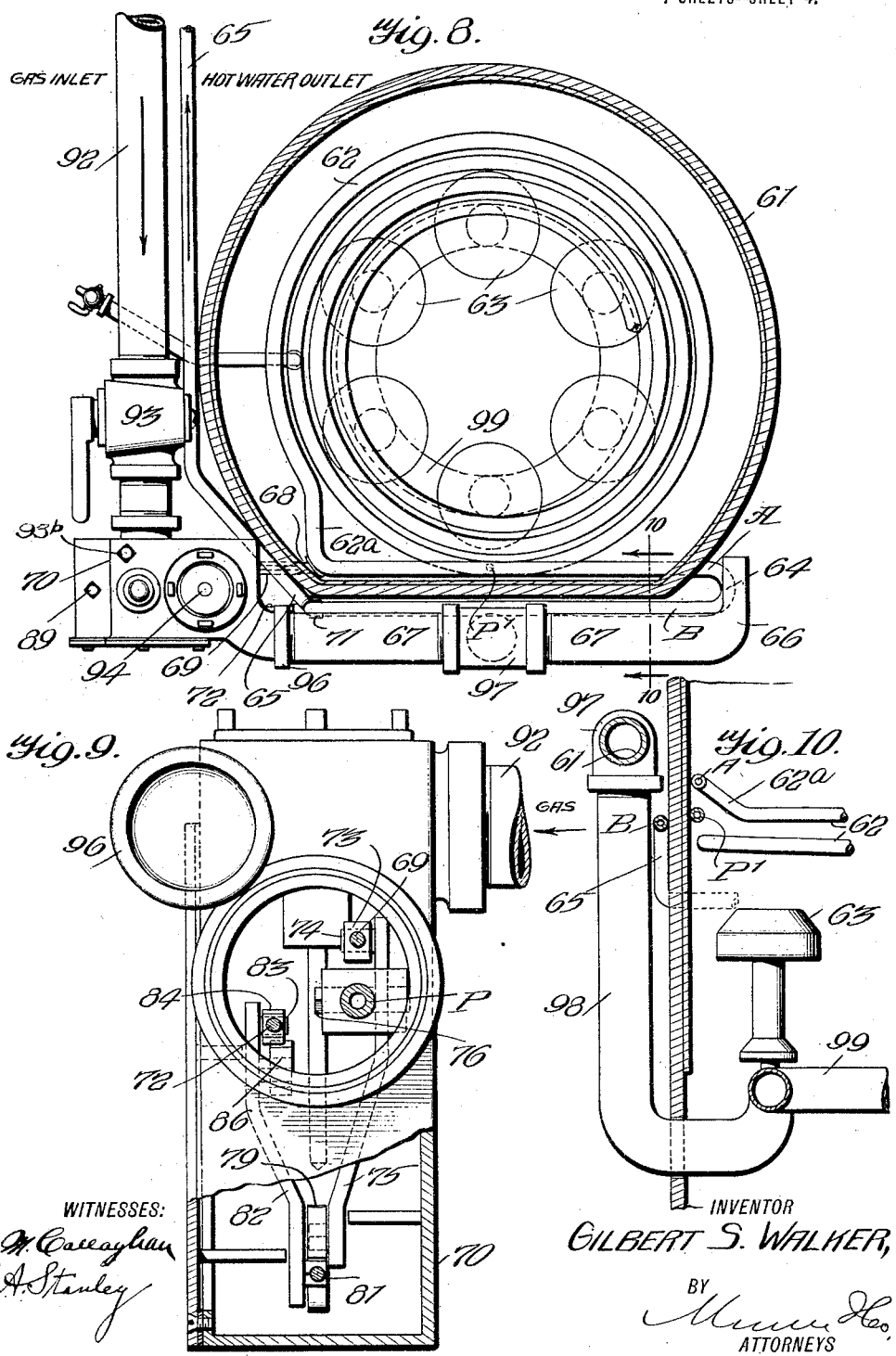

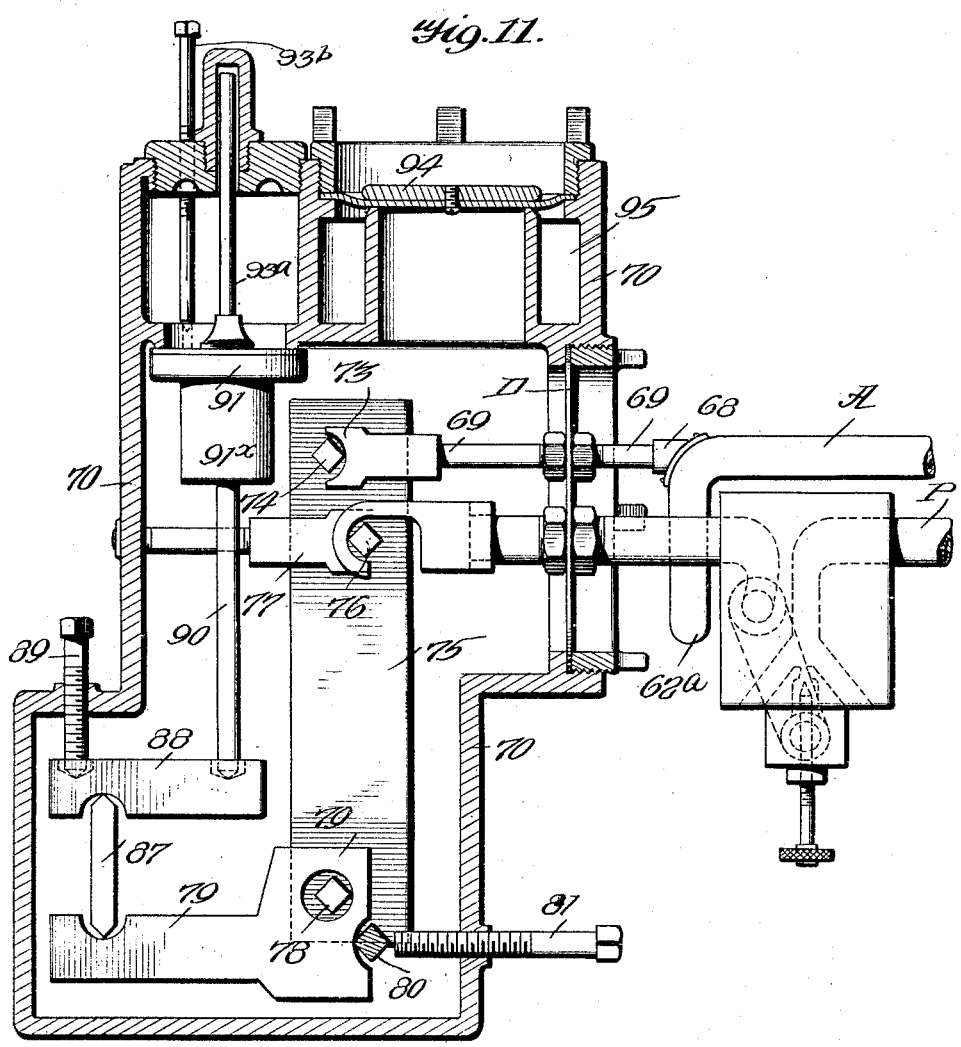

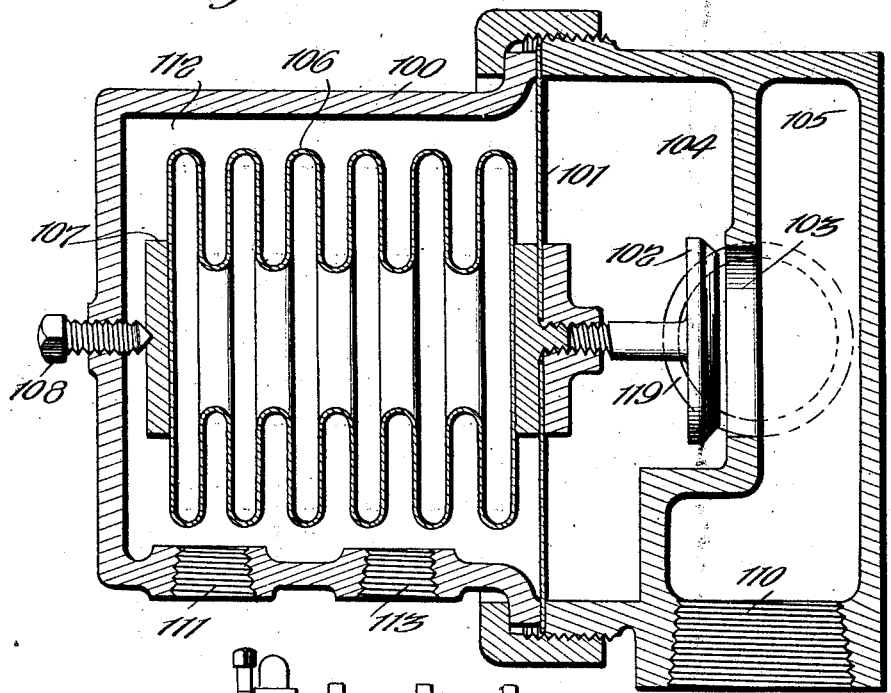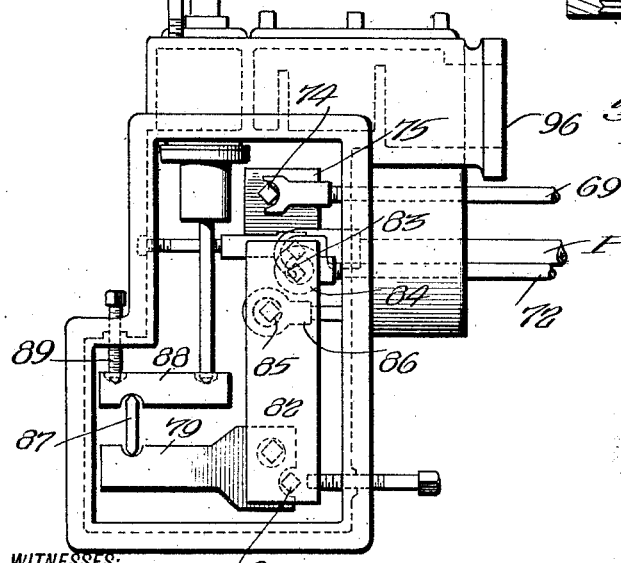

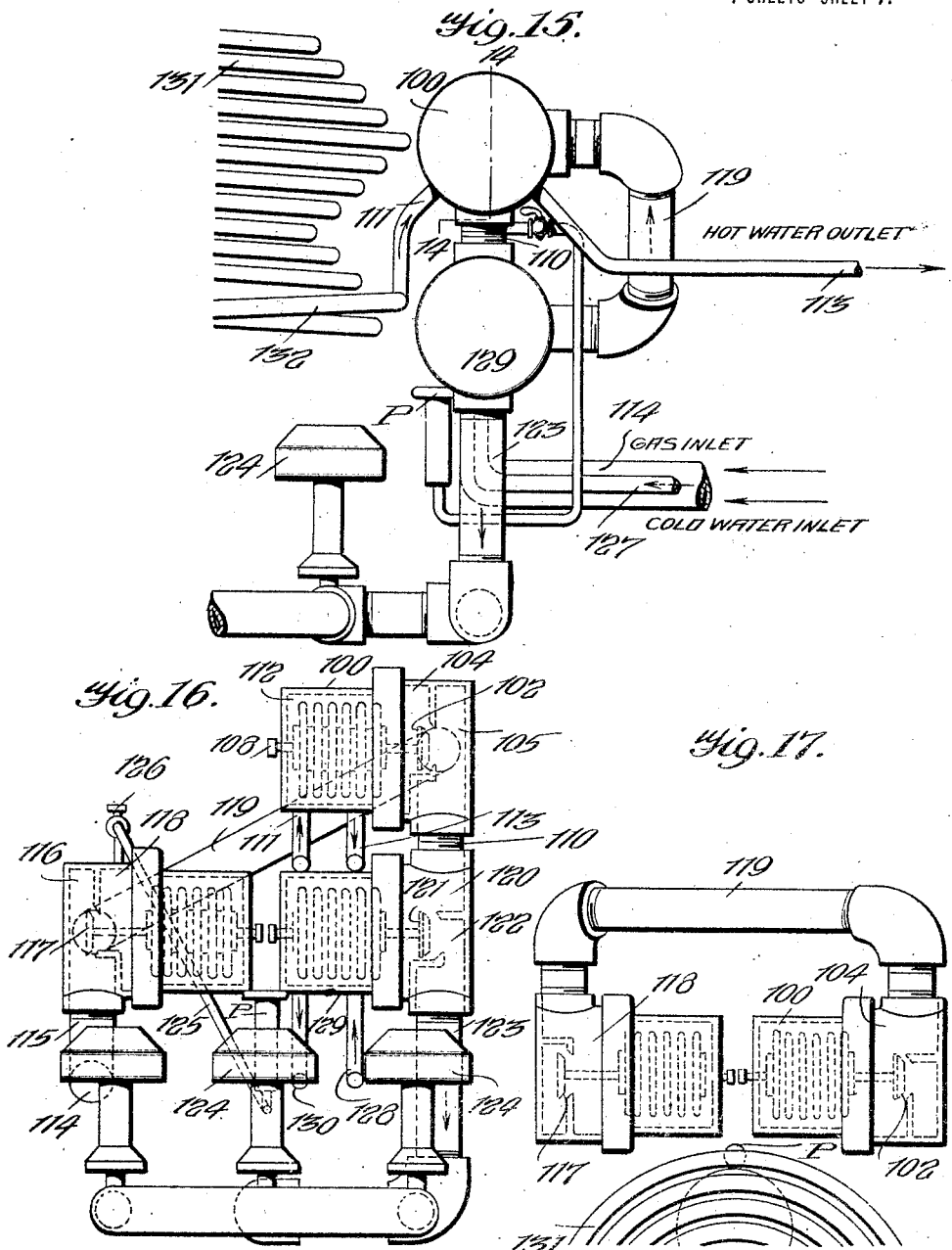

GILBERT S. WALKER, OF BROOKLYN, NEW YORK.

AUTOMATIC WATER-HEATER.

1,366,043. Specification of Letters Patent. Patented Jan. 18, 1921.

Application filed March 18, 1916. Serial No. 85,090.

*To all whom it may concern:*

Be it known that I, GILBERT S. WALKER, a citizen of the United States, and a resident of Brooklyn, in the county of Kings and State of New York, whose post-office address is care of American Society of Mechanical Engineers, 29 West 39th street, New York, N. Y., have invented a certain new and useful Improvement in Automatic Water-Heaters, of which the following is a specification.

My invention relates to automatic water heaters, and it consists in the combinations, constructions, and arrangements herein described and claimed.

The object of my invention is to provide a water heater whose automatic action is dependent upon the differential action of two thermostats, with the intent of eliminating the piston water valve which has heretofore been used in all successful heaters of this type, but which is objectionable because the piston valve frequently sticks and causes accidents or puts the heater out of commission.
A further object of my invention is to eliminate stuffing boxes, glands, etc., which cause friction and reduce the sensitiveness of the regulation, being liable to stick and also liable to leak.
A further object of my invention is to provide an automatic water heater which is economical in the consumption of gas, is safe, simple, and comparatively cheap.

Other objects and advantages will appear in the following specification, and the novel features of the invention will be particularly pointed out in the appended claims.

My invention is illustrated in the accompanying drawings forming part of this application, in which:

Figure 1 is a front view of the device.

Fig. 2 is a section along the line 2—2 of Fig. 1.

Fig. 3 is a horizontal section along the line 3—3 of Fig. 1.

Fig. 4 is an enlarged horizontal section along the line 4—4 of Fig. 1.

Fig. 5 is a vertical section through the valve chamber taken on the section line 5—5 of Figs. 2 and 3.

Fig. 6 is an end view of the valve chamber from a point inside the heater casing.

Fig. 7 is a sectional view of a fragmentary portion of the device.

Fig. 8 is a horizontal section of a modified form of the device.

Fig. 9 is a side elevation of the valve chamber of the modified form shown in Fig. 8, the diaphragm being removed.

Fig. 10 is a vertical section through a portion of the modified form.

Fig. 11 is a vertical section through the valve chamber of the modified form.

Fig. 12 is a face view of the diaphragm.

Fig. 13 is a view of the valve chamber with the cover removed.

Fig. 14 is an enlarged sectional view through a portion of another modified form of the device along the line 14—14 of Fig. 15.

Fig. 15 is a side view of the modified form of the device a portion of which is shown in Fig. 14.

Fig. 16 is a vertical section through the modified form shown in Figs. 14 and 15, and

Fig. 17 is a plan view of the parts shown in Figs. 14 to 16 inclusive.

Referring now particularly to Fig. 1, I have shown therein a heater comprising an outer casing 1 supported on legs 2 and having on the inside thereof, a water heating coil 3, which in the present instance is shown connected at its top with a cold water inlet pipe 4 which is designed to be provided with a regulating cock (not shown) of the ordinary type for regulating the flow of cold water through the coil.

It will be observed that the coil is disposed above a set of burners $5^a$, $5^b$, $5^c$, etc. A drain pipe 6 which is provided with a stop cock 7 is connected to the lowest part of the coil, and by means of which sediment may be flushed out.

From the lowest point of the coil, the latter is inclined upwardly as shown at $3^a$. In the drawing I have shown only a certain portion inclined upwardly, but it will be understood that in fact this would be preferably one or more final turns on an upward spiral, so that if overheated, the bubbles of steam may pass up into a thermostat hereinafter described, instead of into the main coil, as would otherwise be the case if there were not this final upward inclination of the coil. The end $3^a$ of the coil is turned vertically to form a short riser $3^b$, see Fig. 1, the top of which is connected at 8 to the top of the water space 9 of the main thermostat T, see Figs. 1 and 6. The thermostat may be of any well known type. In the present instance I have shown a thermostat comprising an outer tube T, closed at the upper end 10, and having its lower end screwed into an extension 11 of the valve chamber 23 above a small water chamber 13, see Fig. 6. Within the tube T is an inner tube 14, preferably of copper, which is closed at its top end. The lower end of the tube 14 runs down somewhat farther than the outer tube T and its end is expanded or otherwise firmly fixed in the opening 15 between the interior of the valve chamber 23 and the water chamber 13. Within the tube 14 is a rod 16 of porcelain, with its upper end pressed against the closed top end of the inner tube 14, and with its lower end extending down into the valve chamber, where it bears on a lever presently to be described. The expansion and contraction of the inner tube 14 constitutes the operating power of the thermostat. Its lower end is fixed, while its upper end is free to move up and down under the changing influence of temperature. This movement is transmitted to the main lever by the rod 16 which is of negligible expansibility.

A second thermostat $T^a$ is provided and this thermostat has parts which correspond to the main thermostat T; that is to say, it is provided with an outer tube $T^a$, an inner tube 14', a central rod 16', a water chamber 13', the lower end of the rod 16' bearing on a lever and the upper end bearing on the closed end of the inner tube 14'. As will be seen from Fig. 6, the water chambers 13 and 13' are connected by means of a passage 17. The thermostats T and $T^a$ are connected at their tops by means of a small water passage 18, thus placing in communication the water spaces 9 and 9' between the outer tubes and the inner tubes of the two thermostats T and $T^a$, respectively. A hot water outlet pipe 20 is fastened to a connection 21 which communicates with the water chamber 13 of the main thermostat T. This pipe 20 is designed to conduct the hot water from the heater to the hot water piping system of the house, and hence out at the particular faucet which is open at the time. Under ordinary conditions, all the hot and cold water pipes and passages will be full of water at city pressure, and no reduction of this is necessary to operate the heater, as will be explained later.

A gas inlet pipe 22 which leads from the city gas main or other source of fuel supply, conducts the gas to the valve chamber 23, a suitable cock 24 being provided for shutting off the flow. Under normal conditions, the entire interior of the valve chamber 23 will be filled with gas at city pressure. At 25, see Fig. 3, a pipe 26 enters the valve chamber, a cock 27 being provided in the pipe. This pipe leads to mixers 28 which communicate with one or more pilot burners 29. These pilot burners 29 are so placed that they will heat both the thermostats equally, or nearly so. If the auxiliary thermostat receives slightly the larger share of heat from the pilot or is slightly the more sensitive, then the gas will be shut off tighter if the pilot is blown out, and the heater, therefore, will be safer than it would be if the main thermostat received the larger share of heat from the pilot or was the more sensitive of the two. The pilot burners should be in a favorable location for igniting the adjacent main burners and for igniting each other. They should also be located so that they cannot be both blown out by any draft or miniature explosion. All the burners both large and small, should be placed close enough together to ignite from their neighbors.

In the valve chamber 23 is a main gas valve 30 for controlling the flow of gas to the main burners. It is operated automatically by the thermostats and levers in the manner to be described later on. Below the gas valve is a threaded connection 31 into which is screwed a gas pipe 32 which conducts the gas to the main burners. This pipe extends down to the bottom of the heater where it turns inwardly and passes through the heater casing 1 at 33 and is connected with the gas ring 34. This connection should be between the two main burners $5^a$ and $5^b$, see Fig. 1, that are adjacent to the pilot burners 29. This part of the gas ring and the opening to the mixers of these two burners should be so disposed that they will get the first puff of gas and be ignited a second or so before the next burner and so on, around to the burners at the back of the ring.

Disposed within the valve casing 23, see Figs. 2 and 5, is a lever 35 whose top is pressed upon by the rod 16, this rod 16 being pointed as shown in Fig. 6, and engaging the lever in a recess $35^a$. Between the point of engagement of the rod 16 with the lever, and the adjacent end of the lever, is a fulcrum point, this point being in a recess $35^b$ on the under side of the lever 35, the fulcrum being a screw 36 which projects upwardly through a screw plug 37 in the bottom of the valve casing 23. The screw 36 is adjustable. The long arm of the lever 35 is provided with a laterally extending knife edge 38 which bears on an intermediate lever 39, see Figs. 2 and 5.

A second lever 40 is pressed upon by the rod 16' of the auxiliary thermostat, and is provided with a screw fulcrum 36' carried by a screw plug 37' which is similar to the screw 36 and plug 37. The lever 40 is extended and upward movement of its end is limited by a screw 41, see Fig. 5. The lever 40 has an outwardly extending knife edge 43 which also bears on the intermediate lever 39. The opposite end of the intermediate lever 39 is provided with a knife edge 44 which bears on the under side of a valve lever 45. One end of this valve lever fulcrums on an adjusting screw 42 and the other end extends through a slot 46 in the valve stem 47 of the valve 30. This valve stem has a guide portion 48 which extends upwardly through a screw cap 49, the upper end of the stem being housed in a cap 50. Below the valve 30 is a guide 30$^x$ which extends through a guide member 30$^y$.

Disposed within the interior of the valve casing 23 is a fulcrum member 51, see Fig. 5, which in this instance I have shown as a screw carried by a plate 52, the latter being supported by a spring 53. The fulcrum member 51 bears against the under side of the lever 39 at 54, see Fig. 5, which provides a resilient or yielding fulcrum point, keeping a uniform pressure on the levers and thermostats.

The bearing points of all the levers are located so that there will be no tendency to tip any of the levers over sidewise.

From the foregoing description of the various parts of the device, the operation thereof may be readily understood.

Before explaining the operation, however, it is necessary to consider the action of the water in the two thermostats, T and T$^a$. An essential feature of the arrangement which has been described is that if the auxiliary thermostat gets overheated there may be a local flow of water upwardly through the auxiliary thermostat, thence through the connecting passage 18 downwardly through the main thermostat, and returning to the auxiliary thermostat by the passage 17. It is also essential that a reverse flow shall not be produced by the turning on of the water or that such flow of water through the auxiliary thermostat shall be so small that the small amount of heat reaching it from the main burners will be sufficient to keep its temperature materially higher than the temperature of the main thermostat, notwithstanding the fact that the main thermostat receives the greater amount of heat.

The desired result may be accomplished in a number of ways, but I prefer to make the upper connecting passage so small that the flow of water will be cut down and the effect of the reverse flow in the auxiliary thermostat will be virtually eliminated. It is also essential that the main water connections of these thermostats should run downward to prevent the warm water from circulating away from the thermostats to cooler parts of the heater and that excessive radiation be prevented, so that a small pilot flame will be sufficient to keep both thermostats lukewarm.

Let us assume that all the parts are cold and that the main valve 30 is closed. The pilot burners are now lighted. Since the water is not being drawn off and there is no flow of water through the heater, both the thermostats T and T$^a$ will be warmed slightly. This will produce an expansion of the inner tubes 14 and 14′ of both thermostats and a corresponding movement of the rods 16 and 16′ which, as stated before, are held against the ends of the inner tubes 14 and 14′. These movements, however, are equal, and hence there will be no appreciable effect on the main gas valve 30.

If water is now drawn, the main thermostat T will be chilled by the flow of the water through it, but the auxiliary thermostat T$^a$ will not be affected materially. The chilling of the main thermostat will cause a contraction of the tube 14, thus forcing the rod 16 downwardly and transmitting the movement through the lever 35, knife edge 38, intermediate lever 39, and lever 45, to the stem of the valve 30, thereby opening the latter. Gas will now flow to the main burners and will be ignited by the pilot burners. The coil and both thermostats will now be heated. The auxiliary thermostat T$^a$ will heat up faster, because the water in it is stationary or nearly so, and the main gas valve will, therefore, be kept open. When the auxiliary thermostat T$^a$ has reached a temperature high enough to bring the auxiliary lever 40 into contact with the temperature regulating screw 41 it can have no further effect in counteracting the movement of the main lever 35. Further heating of the main thermostat T will now close the main gas valve partly or entirely, and will regulate the flow of gas and the temperature of the water, so that the water will continue to be delivered for as long as desired, at a temperature not much above that for which the temperature regulating screw 41 was set. At any time that the flow of water is stopped, the main thermostat will quickly reach the temperature of the auxiliary thermostat or exceed the limit of operation of the auxiliary thermostat, and the main gas valve will be closed. Both the thermostats will then cool down together without opening the main gas valve 30.

In Figs. 8 to 13 inclusive, I have shown a modified form of the device in which a small difference in temperature between the main thermostat and the auxiliary thermostat serves to keep the main gas valve closed, while equalization of these temperatures opens it. It is, therefore, essential in this form that local circulation of water between the two thermostats be prevented. In these two respects the second form is the exact opposite of the first form, except, of course, that both forms depend for their successful operation upon the differential action of two thermostats.

This form of the device comprises a heater casing 61 inclosing a heating coil 62 heated by burners 63. The coil 62 is connected by a short riser 62ᵃ to the main thermostat A. This projects through an opening in the casing 61 which is large enough to permit the necessary movement of the thermostat. This main thermostat A is horizontally disposed, and the greater part of its length is within the heater casing. At one end of the main thermostat A there is a water passage 64 which slopes downward and forward and connects with the corresponding end of the auxiliary thermostat B. This auxiliary thermostat is also horizontally disposed, but is entirely outside of the heater casing and its level is several inches below that of the main thermostat A. At the free or left end of the auxiliary thermostat, see Fig. 8, there is connected a flexible hot water outlet pipe 65. This hot water pipe 65 conducts the water to the piping system of the house. The main thermostat A with the riser 62ᵃ, and water passage 64, constitutes an inverted trap. The water that has been warmed by the pilot burners P' and which is therefore lighter, will be retained in this thermostat instead of circulating away to the other parts of the heater. One end of the thermostat A is securely attached by an end piece 66 to a frame 67. At the opposite end of the thermostat there is attached a block 68 into which is screwed a rod 69 to transmit the movement of the thermostat to the main lever within the valve casing or chamber 70.

In like manner the auxiliary thermostat B, which is also made of the same material, that is to say, preferably of copper, is attached by the end piece 66 to the frame 67 and has a block 71 to which a rod 72 is attached to transmit its movement to the auxiliary lever within the valve chamber 70. The frame 67 is, in fact, composed of pipes closed at the end 66 and open at the other end to the chamber 95 on the valve chamber 70.

Referring now particularly to Fig. 11, it will be seen that a diaphragm D is provided to allow free movement of the rod without leakage of gas. The rod 69 has a bearing 73 on a knife edge 74 of the main lever 75. The fulcrum of this main lever is at 76, the fulcrum bearing on a screw stud 77 carried by the casing 70. The lever extends downwardly and has at its lower end a knife edge 78, one side of which presses against an intermediate lever 79, the end of which is also pressed by means of a knife edge carried by the auxiliary lever 82, this knife edge being shown at 80. A regulating screw 81 is carried by the casing, and limits the movement of the lever 82.

Referring now particularly to Fig. 9, it will be seen that there is an auxiliary lever 82 which has a knife edge 83 similar to the knife edge 74 of the lever 75, this knife edge being engaged by the bearing 84 at the end of the rod 72, see Fig. 13. It will be noted that the knife edge 83 is engaged on the left side, while the knife edge 74 is engaged on the right side. The lever 82 fulcrums on the right side of a knife edge 85 against the screw stud 86 carried by the wall casing. The lever 82 extends downwardly and has at its lower end a knife edge 80, the left side of which presses against the right side of the lower short arm of the intermediate lever 79. As in the preferred form, the centers of the three bearings are in a straight line, although the body of the lever is curved to convenient shape.

The long arm of the intermediate lever 79 extends horizontally to the left and the upper side of its end presses against the bottom of a rocking knife edge 87, the upper end of which presses against the under side of a horizontally disposed gas lever 88. One end of this lever is pressed upon by an adjustable screw 89 and the opposite end presses against a valve stem 90, which carries a main gas valve 91 at its upper end. The latter is normally urged away from its seat by a weight 91ˣ on the valve stem. This weight, acting through the system of levers just described, keeps the main thermostatic tube A under a strong compressive stress and keeps the auxiliary thermostatic tube B under an equally strong tensile stress. A gas inlet 92, see Fig. 8, is connected to the city gas main, and conducts gas through the gas cock 93 to the small chamber 93ᵃ on the lever casing 70.

On the top of the valve casing 70 is a relief valve 94 which permits an excess pressure of gas to go into the chamber 95, the latter communicating by means of a coupling 96, see Figs. 8 and 9, with the pipe 67 which forms the frame of the thermostat. From here it is conducted to the tee 97, see Figs. 8 and 10, and thence by the pipe 98 to the gas ring 99.

The right hand end of the pilot pipe P is attached to the end piece 66 and its left end extends into the valve chamber 70 and is provided with a forked bearing adapted to come into contact with the knife edge 76 under certain conditions explained further on.

The operation of this form of the device is as follows: The pilot light P' burns continuously and keeps the main thermostat tube A lukewarm as long as no water is drawn to disturb the conditions. The auxiliary thermostat B is maintained at as low a temperature as practicable, by exposing it to convection and placing it so that it can radiate heat freely. The gas valve 91 is now adjusted by the screw 89 until it is closed. A small by-pass around this main gas valve, designed to be controlled by any suitable cock 93ᵇ supplies the gas through pipe P for the pilot burner, which draws in air from the mixer. As will be seen from Fig. 10, the pilot burner P' is disposed underneath the main thermostat A. If, now, for any reason, the difference in temperature between the two thermostatic tubes A and B becomes less, there will be a slight movement of the levers opening the main gas valve slightly and supplying more gas to the pilot. The gas pressure in the lever chamber 70 will not be great enough to open the check valve 94.

If water is now drawn through the heater, the temperature of the two thermostatic tubes A and B will be equalized and the levers will move and the main gas valve 91 will be fully opened. Increased gas pressure in the lever chamber 70 will cause the pilot to flash up in a big flame and will cause the check valve 94 to rise, allowing gas to flow to the main burners where it will be ignited by the large pilot flame and the coil will be heated. As the flowing water becomes hotter, both thermostatic tubes A and B will be heated and will expand together. This will have no effect on the main gas valve 91, because the tendency of the main thermostat A to close the gas valve is neutralized by the tendency of the auxiliary thermostat B to open it.

When, however, the temperature of the auxiliary thermostat B has reached that for which the temperature regulating screw 81 has been set, the auxiliary lever 82 can move no farther and the continued movement of the main lever 75, due to the higher temperature of the flowing water, will close the gas valve partly or entirely and will regulate the supply of gas accurately to suit the amount of water being drawn and insure its delivery at uniform temperature.

When the flow of water stops, the auxiliary thermostat B will cool off by radiation, convection, etc., while the main thermostat A will continue to be heated (a few seconds) by the main burner, by local circulation of water up from the lower turn of the main coil, and by the pilot burner. As soon as there is a few degrees of difference in temperature, the gas valve will be closed.

If the pilot light should go out, the contraction of the pipe P' will operate the main lever 75 and close the gas valve.

The third form of the device is set forth in Figs. 14 to 17 inclusive. In this form of the device, there are three thermostatically operated gas valves, the arrangement being substantially identical with that shown in Fig. 14, in which a casing 100 contains the diaphragm 101 to which is secured a valve 102 arranged to seat in the opening 103 between an inner chamber 104 and an outer chamber 105. On the opposite side of the diaphragm is a thermostatic member 106 which may be filled or partly filled with a volatile fluid or expansible liquid. One end of this thermostat bears on the diaphragm 101 and the other on a plate 107 which is adjusted by a screw 108. The gas enters through a pipe 119 which communicates with the interior chamber 104, and passes out through an opening 110 communicating with the outer chamber 105. The water enters through a port 111 which communicates with a water space 112 surrounding the thermostat 106 and leaves by the port 113. A gas inlet pipe 114 is connected at 115 to the outer chamber 116 of the safety gas valve 117. To the inner gas chamber 118 of this valve there is connected a gas pipe 119 which is inclined upwardly and which is in communication with the inner chamber 104 of the main valve, 102 as already stated. The chamber 105 is connected with an inner gas chamber 120 of an auxiliary gas valve 121. An outer chamber 122 is connected by a pipe 123 with the main burners 124.

The top of the inner gas chamber 118 of the gas valve 117 is connected by means of a pipe 125 with the pilot burner P, a cock 126 being provided for regulating the pilot flame. A cold water inlet pipe 127 conducts the water in the direction of the arrow, see Fig. 15, and terminates in a short riser 128, the top of which is connected with the bottom of a water space 129, see Fig. 16, of the auxiliary valve 121. A water pipe 130 leads downwardly to a return bend connecting with the top of the coil 131 by a pipe, not shown. The lower end of this coil terminates in an inclined pipe 132 which is connected by a pipe 111, see Fig. 15, with the bottom of the water space 112 of the main valve 102 as before stated, the hot water outlet being at 113.

The operation of this form of the device is as follows: The heat from the pilot light keeps the auxiliary thermostat, which controls the valve 121, lukewarm, and the valve is adjusted to close at this temperature. The heat from the pilot also keeps the safety thermostat warm whose valve 117 is adjusted to fully open at this temperature. The main thermostat is adjusted to close its valve 102 at the temperature at which the hot water is drawn, and will be opened when below this temperature.

If, now, water is drawn through the heater, the inflowing cold water will chill the auxiliary thermostat and its gas valve 121 will be opened, supplying fuel to the burners. When the outflowing water reaches the desired temperature, the main thermostat will operate the valve 102 to reduce or stop the supply of gas. Whenever the flow of water stops, the auxiliary thermostat will be warmed the requisite amount by the pilot light aided by heat from the main burners. The gas supply will then be stopped. Under some circumstances, the gas may be shut off by the main thermostat through local circulation of water to it from the last turns of the coil. This effect may be facilitated by making another water connection between the coil and the main thermostat, in a well known manner.

If the pilot light should go out, the safety thermostat will close its valve 117 and shut off all the gas.

I claim:—

1. In an automatic water heater, the combination of a normally inactive burner, a thermostatic means for bringing the burner into action when water is being drawn, and a second thermostatic means for regulating the temperature of the water.

2. In an automatic water heater, the combination of a water heating coil, normally inactive burners for supplying heat to the coil, a plurality of thermostats and means operated by the differential action of said thermostats for automatically bringing said burners into action.

3. In an automatic water heater, the combination of a water heating coil, normally inactive burners for supplying heat to the coil, a plurality of thermostats, and means operated by the differential action of said thermostats for bringing said burners into action and for subsequently regulating said burners to control the heat imparted to the coil.

4. In an automatic water heater, the combination of a water heating coil, normally inactive burners for supplying heat to the coil, a pair of similar thermostats, and means operated by the conjoint action of said thermostats for bringing said burners into action.

5. In an automatic water heater, the combination of a water heating coil, normally inactive burners for supplying heat to the coil, a pair of thermostats, and means operated by the conjoint action of said thermostats for bringing said burners into action and for subsequently cutting off the heat from the burners when the water has reached a predetermined temperature.

6. In an automatic water heater, a water heating coil, a plurality of burners for said coil, a valve for controlling the burners, a pair of thermostats connected with said coil, a valve chamber for said valve, a plurality of levers disposed within said valve chamber, one of said levers being arranged to operate on said valve for opening and closing the latter and the other levers being disposed in operative relation with each of the said thermostats.

7. In an automatic water heater, the combination of a water heating coil, a main thermostat connected therewith, an auxiliary thermostat connected with said main thermostat, a valve casing, levers disposed within said valve casing, certain of said levers being operatively connected with each of said thermostats, one of said levers being operatively connected with the valve, and means for adjusting the range of operation of one of said thermostats to any predetermined temperature.

8. In an automatic water heater, the combination of a water heating coil, of a main thermostat connected therewith, an auxiliary thermostat connected in parallel with said main thermostat, burners for heating said main and auxiliary thermostats, main burners for heating said coil, a valve for controlling the flow of fuel to said main burners, a lever arranged to be acted on by each of said thermostats, and an intermediate lever for operating the valve under the conjoint and differential action of said first named lever.

9. In an automatic water heater, the combination of a water heating conduit, a burner, a gas supply valve therefor, a power transmitting lever arranged to operate said gas valve, two power applying mechanisms for said lever, each adapted to act as the lever's fulcrum when the other is in operation, each of said mechanisms including a thermostat actuated by the temperature of the water, whereby the movement of either of said thermostats varies the effective action of the other upon said valve.

10. In an automatic water heater, the combination of a water receptacle, a normally inactive burner for supplying heat to the receptacle, a pair of similar thermostats, and means operated by the differential action of said thermostats for bringing said burner into action.

11. In an automatic water heater, the combination of a water heating receptacle, a normally inactive burner for supplying heat to the receptacle, a plurality of thermostats, and means operated by the conjoint action of said thermostats for automatically bringing said burner into action.

12. In an automatic water heater, a source of fuel supply, thermostatic means for regulating the fuel supply while the water is flowing, and auxiliary thermostatic means for cutting off the fuel supply while the water is stationary.

13. In a water heater, a main burner, an auxiliary burner, a gas valve for controlling the flow of gas to the main burner, and a thermostatic mechanism for operating the gas valve and controlled by the heated water, the said thermostatic mechanism being compound and having one of its elements exposed to a part of the water warmed by the auxiliary burner and the other element exposed to the outflowing water.

14. In an automatic water heater, thermostatic means for controlling the fuel supply, said means being operated by the difference in temperature of the water at different parts of the heater when below a predetermined temperature and by the maximum temperature of the water independently of the difference of temperature when above said predetermined temperature.

15. In an automatic water heater, a coil, a burner, a gas supply, a plurality of thermostats, and means actuated by the thermostats for controlling the gas supply in accordance with the difference of temperature of the thermostats when below a predetermined temperature and in accordance with the maximum temperature independently of the difference of temperature when above the predetermined temperature.

16. In an automatic water heater, the combination of a water heating receptacle, a main burner for supplying heat to the receptacle, a pair of thermostats, an auxiliary burner for warming both of said thermostats, and means operated by the differential action of said thermostats for controlling the supply of fuel to the main burner.

17. In an automatic water heater, the combination of a valve controlling the fuel supply, a main thermostat, means actuated thereby for operating said valve, an auxiliary thermostat in the hot water outlet, and means actuated thereby for changing the adjustment and the temperature at which the main thermostat operates the valve.

18. In an automatic water heater, the combination of a water heating receptacle, a burner for heating the receptacle and the water therein, a valve controlling the fuel supply of the burner, a means for operating said fuel valve, a pair of thermostats, each tending to move said fuel valve a like amount in opposite directions so that said fuel valve will remain stationary when the temperatures of the two thermostats change together.

19. In an automatic water heater, the combination of a water receptacle, a normally inactive burner for supplying heat to the receptacle, a valve for controlling the supply of fuel to the burner, a main thermostat for regulating the valve, an auxiliary thermostat, and means operated thereby for automatically bringing the burner into action when the temperature of the auxiliary thermostat increases.

20. In an automatic water heater, the combination of a water heating receptacle, a burner for the heating thereof, a valve for controlling the supply of fuel to the burner, a plurality of thermostats, means actuated by the thermostats for operating the valve in accordance with the difference in temperature of the thermostats and means for limiting the action of one of said thermostats so that above a predetermined temperature the valve is controlled by one of said thermostats independently of the other.

21. In an automatic water heater, the combination of a water heating receptacle, a main burner for heating the receptacle and the water therein, a valve for controlling the supply of fuel to the burner, a continually active auxiliary burner, two thermostats, one of which is heated by the water and the other by the main burner, and means actuated by both of said thermostats for operating the fuel valve.

22. In an automatic water heater, a differential thermostatic mechanism for controlling the fuel supply for the purpose described, one element of said thermostatic mechanism responding to the temperature of a portion of the water, and to heat from an auxiliary burner, and the opposed element of said thermostatic mechanism responding to the temperature of a different portion of the water.

23. In an automatic water heater, the combination of a thermostatically operated fuel valve, an auxiliary thermostat kept warm by an auxiliary burner, and means actuated by said auxiliary thermostat for changing the temperature adjustment of the thermostatically operated fuel valve.

24. In an automatic water heater, the combination of a burner for heating the water, a valve controlling the fuel supply of the burner, a means for operating said fuel valve, a pair of thermostats, one of which is kept warm, each of said thermostats tending to move the fuel valve in an opposite direction nearly the same amount for each degree of change in temperature so that said fuel valve will remain nearly stationary when the temperature of the two thermostats changes together.

25. An automatic water heater including in combination a burner for heating the water, a thermostatic means adapted to regulate the burner in accordance with the temperature of the hot water near the outlet, and a thermostatic means cooled by the flow of water to bring the burner into operation.

26. An automatic water heater including in combination, a burner for heating the water, a fuel supply for the burner, a thermostatic means adapted to proportion the fuel inversely to the temperature of the hot water near the outlet, and a thermostatic means associated therewith, which, when warmed, puts the burner out of action.

27. In an automatic water heater, a main thermostat responding to the temperature of the hot water, an auxiliary thermostat adapted to bring the burner into action, a gas valve, and a lever having three bearing points connected respectively to said three devices so that the point to which the main thermostat is connected is adapted to act as the fulcrum while the auxiliary thermostat actuates the gas valve, and the point to which the auxiliary thermostat is attached is adapted to act as the fulcrum while the main thermostat actuates the gas valve.

28. In an automatic water heater, a main burner for heating the water, two thermostats, a small burner adapted to warm both of said thermostats, two levers operated respectively by said thermostats, a third lever operated jointly by the two first mentioned levers, and a gas valve operated by the last mentioned lever, said valve controlling the main burner.

29. In an automatic water heater, a burner, a gas valve, two thermostats adapted to regulate said gas valve, and water connections to both of said thermostats, one of said thermostats being located in the path of the water as it flows through the heater and the other thermostat being out of said path.

30. In an automatic water heater, a burner, a gas supply, a thermostat adapted to control the gas supply, a second means to control the gas supply, said second means being actuated indirectly by water flow and consisting of a thermostat, water connections extending downward from said thermostat adapted to retard dissipation of heat, and means adapted to warm said thermostat.

31. In an automatic water heater, a thermostat exposed to a relatively small amount of water, a small burner for heating said small amount of water, means for limiting the escape of heat from said small amount of water, a main burner, means operated by said thermostat for bringing the main burner into action, a second thermostatic means adapted to control the main burner, and communication from the thermostat of said second thermostatic means to the outflowing hot water.

32. In an automatic water heater, a gas valve, a thermostat adapted to close said gas valve when the flowing water reaches a predetermined temperature, a second thermostat, and means operated thereby adapted to change the temperature adjustment of the first thermostat so that the gas valve will be closed at a low temperature when the water is not flowing.

33. In an automatic water heater, a burner for heating the water, a gas valve controlling said burner, two thermostats, and means adapted to move said gas valve in response to differential action of said thermostats and allow said gas valve to remain stationary when the two thermostats cool simultaneously.

34. In an automatic water heater, a coil, a main burner, a gas valve, a main thermostat at the outlet of the coil, compound levers connecting the main thermostat to the gas valve to enable it to regulate the temperature of outflowing hot water, a negatively acting auxiliary thermostat parallel with the main thermostat and connected to one of the fulcrums of the compound levers to counteract any movement of the main thermostat so that the gas valve remains stationary when the temperatures of the two thermostats change together and opens only when the main thermostat gets cooler than the auxiliary thermostat, an auxiliary burner to light the main burner and warm both thermostats equally, water connections to the thermostats adapted to cause any flow of water to cool the main thermostat relatively to the other and bring the main burner into action, and a limit stop to put the auxiliary thermostat out of action when the main burner has heated the thermostats to a predetermined temperature and enable the main thermostat to regulate the temperature of the outflowing hot water independently of the auxiliary thermostat.

GILBERT S. WALKER.